(12) United States Patent
Wu et al.

(10) Patent No.: US 11,842,052 B2
(45) Date of Patent: *Dec. 12, 2023

(54) METHOD AND APPARATUS FOR FINE TUNING AND OPTIMIZING NVME-OF SSDS

(71) Applicant: Samsung Electronics Co., Ltd., Suwon-si (KR)

(72) Inventors: Wentao Wu, Milpitas, CA (US); Sompong Paul Olarig, Pleasanton, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

This patent is subject to a terminal disclaimer.

(21) Appl. No.: 17/400,988

(22) Filed: Aug. 12, 2021

(65) Prior Publication Data
US 2021/0373778 A1    Dec. 2, 2021

Related U.S. Application Data

(63) Continuation of application No. 16/866,206, filed on May 4, 2020, now Pat. No. 11,573,707, which is a
(Continued)

(51) Int. Cl.
    *G06F 3/06*         (2006.01)
    *G06F 13/42*       (2006.01)
    *G06F 13/40*       (2006.01)

(52) U.S. Cl.
CPC .......... *G06F 3/0613* (2013.01); *G06F 3/0631* (2013.01); *G06F 3/0635* (2013.01);
(Continued)

(58) Field of Classification Search
CPC .... G06F 3/0613; G06F 3/0635; G06F 3/0688; G06F 13/4022; G06F 13/4282
(Continued)

(56) References Cited

U.S. PATENT DOCUMENTS

| 5,377,121 A | 12/1994 | Dimitri et al. |
| 5,790,890 A | 8/1998 | Mirov et al. |

(Continued)

FOREIGN PATENT DOCUMENTS

| CN | 101271420 A | 9/2008 |
| CN | 103176884 A | 6/2013 |

(Continued)

OTHER PUBLICATIONS

Final Office Action for U.S. Appl. No. 16/866,206, dated Nov. 2, 2021.

(Continued)

*Primary Examiner* — Paul R. Myers
(74) *Attorney, Agent, or Firm* — Renaissance IP Law Group LLP (57) ABSTRACT

A data storage system includes: a plurality of data storage devices; a motherboard containing a baseboard management controller (BMC); and a network switch configured to route network traffic to the plurality of data storage devices. The BMC is configured to identify a group of data storage devices among the plurality of data storage devices based on device-specific information received from the plurality of data storage devices and send identifiers of the group of data storage devices to a querying party.

20 Claims, 6 Drawing Sheets

Related U.S. Application Data continuation of application No. 16/384,508, filed on Apr. 15, 2019, now Pat. No. 10,664,175, which is a continuation of application No. 15/674,690, filed on Aug. 11, 2017, now Pat. No. 10,310,745.

(60) Provisional application No. 62/508,811, filed on May 19, 2017.

(52) U.S. Cl.
CPC ........ *G06F 3/0688* (2013.01); *G06F 13/4022* (2013.01); *G06F 13/4282* (2013.01); *G06F 2213/0026* (2013.01)

(58) Field of Classification Search
USPC ......................................................... 710/313
See application file for complete search history.

(56) References Cited

U.S. PATENT DOCUMENTS

| | | | |
|---|---|---|---|
| 6,957,312 | B1 | 10/2005 | Chou et al. |
| 7,568,051 | B1 | 7/2009 | Linstead |
| 7,990,994 | B1 | 8/2011 | Yeh et al. |
| 9,189,385 | B2 | 11/2015 | Cohen et al. |
| 9,298,648 | B2 | 3/2016 | Johnson |
| 9,317,204 | B2 | 4/2016 | Hahn et al. |
| 9,467,511 | B2 | 10/2016 | Tamir et al. |
| 9,483,431 | B2 | 11/2016 | Bergsten et al. |
| 10,073,626 | B2 | 9/2018 | Karamcheti et al. |
| 10,310,745 | B2 * | 6/2019 | Wu .................. G06F 3/0635 |
| 10,664,175 | B2 * | 5/2020 | Wu .................. G06F 3/0631 |
| 10,803,970 | B2 | 10/2020 | Schuh et al. |
| 2008/0313362 | A1 | 12/2008 | Takamoto |
| 2011/0202790 | A1 | 8/2011 | Rambo et al. |
| 2012/0173944 | A1 | 7/2012 | Pan |
| 2013/0159561 | A1 | 6/2013 | Cong |
| 2014/0218199 | A1 | 8/2014 | Cepulis et al. |
| 2014/0281171 | A1 | 9/2014 | Canepa |
| 2014/0325146 | A1 | 10/2014 | Madhusudana et al. |
| 2014/0365820 | A1 | 12/2014 | Durham et al. |
| 2015/0120971 | A1 | 4/2015 | Bae et al. |
| 2015/0356033 | A1 | 12/2015 | Rose et al. |
| 2016/0085772 | A1 | 3/2016 | Vermeulen et al. |
| 2016/0087910 | A1 | 3/2016 | Mittal et al. |
| 2016/0293274 | A1 | 10/2016 | Schuh et al. |
| 2016/0335008 | A1 | 11/2016 | Dasar et al. |
| 2016/0364401 | A1 | 12/2016 | Amit et al. |
| 2017/0060442 | A1 | 3/2017 | Dunn |
| 2017/0083457 | A1 | 3/2017 | Khemani et al. |
| 2017/0199746 | A1 | 7/2017 | Nguyen et al. |
| 2017/0315954 | A1 | 11/2017 | Chung et al. |
| 2018/0032462 | A1 | 2/2018 | Olarig et al. |
| 2018/0032469 | A1 * | 2/2018 | Olarig ................ G06F 13/4282 |
| 2018/0082066 | A1 | 3/2018 | Munjal et al. |
| 2018/0239539 | A1 | 8/2018 | He et al. |
| 2019/0272247 | A1 * | 9/2019 | Olarig ................ G06F 13/4022 |

FOREIGN PATENT DOCUMENTS

| | | |
|---|---|---|
| CN | 104572516 A | 4/2015 |
| CN | 105339913 A | 2/2016 |
| CN | 106325761 A | 1/2017 |
| KR | 101469596 B1 | 12/2014 |

OTHER PUBLICATIONS

Notice of Allowance for U.S. Appl. No. 15/674,690, dated Jan. 15, 2019.

Notice of Allowance for U.S. Appl. No. 16/384,508, dated Jan. 21, 2020.

Office Action for U.S. Appl. No. 15/674,690, dated Aug. 29, 2018.

Office Action for U.S. Appl. No. 16/384,508, dated Sep. 20, 2019.

Office Action for U.S. Appl. No. 16/866,206, dated Jul. 8, 2021.

Minkyeoung Lee et al., "Improving read performance by isolating multiple queues in NVMe SSDs", Proceedings of the 11th International Conference on Ubiquitous Information Management and Communication, IMCOM 2017, Jan. 5, 2017.

K.T. Malladi et al., "Flexdrive: a framework to explore NVMe storage solutions", 2016 IEEE 18th International Conference on High-Performance Computing and Communications, IEEE 14th International Conference on Smart City, and IEEE 2nd International Conference on Data Science and Systems (HPCC/SmartCity/DSS), 1115-22, Dec. 14, 2016.

Yang Zhengyu et al., "A fresh perspective on total cost of ownership models for flash storage in datacenters", 2016 IEEE International Conference on Cloud Computing Technology and Science (CloudCom), 245-52, Dec. 15, 2016.

Electro Manufacturing, "Mellanox launches integrated networking solutions", Electro Manufacturing; Boston vol. 29, https://search.proquest.com/docview/1815128573?accountid=142944 (Copyright Worldwide Videotex Sep. 2016) ProQuest Technology Collection, Sep. 1, 2016.

Final Office Action for U.S. Appl. No. 16/866,206, dated Jul. 6, 2022.

Notice of Alowance for U.S. Appl. No. 16/866,206, dated Sep. 23, 2022.

Office Action for U.S. Appl. No. 16/866,206, dated Mar. 2, 2022.

\* cited by examiner

METHOD AND APPARATUS FOR FINE TUNING AND OPTIMIZING NVME-OF SSDS

CROSS-REFERENCE TO RELATED APPLICATION(S)

This application is a continuation application of U.S. patent application Ser. No. 16/866,206 filed May 4, 2020, which is a continuation application of U.S. patent application Ser. No. 16/384,508 filed Apr. 15, 2019 (now issued to U.S. Pat. No. 10,664,175), which is a continuation application of U.S. patent application Ser. No. 15/674,690 filed Aug. 11, 2017 (now issued to U.S. Pat. No. 10,310,745), which claims the benefits of and priority to U.S. Provisional Patent Application Ser. No. 62/508,811 filed May 19, 2017, the disclosures of which are incorporated herein by reference in their entirety.

TECHNICAL FIELD

The present disclosure relates generally to storage devices, more particularly, to a system and method for fine tuning and optimizing NVMe-oF solid-state drives (SSDs).

BACKGROUND

Non-volatile memory (NVM) express over Fabrics (NVMe-oF) is a new industry standard defining a common architecture that supports an NVMe block storage protocol over a wide range of storage networking fabrics such as Ethernet, Fibre Channel, InfiniBand, and a transmission control protocol (TCP) network. The data storage devices compatible with NVMe-oF standard, herein also referred to as NVMe-oF devices, have similar form factors as standard solid-state drives (SSDs) and hard disk drives (HDDs), for example, 2.5" and 3.5" disk drives. NVMe-oF devices are commonly used in an enterprise environment or in a datacenter. However, the NVMe-oF specification does not address optimization of an NVMe-oF device for specific applications, for example, machine learning and data mining applications. Customers may use NVMe-oF devices that are manufactured by different vendors having different data profiles.

Cloud computing is becoming popular among enterprise users. Instead of owning computing resources, companies prefer to lease computing resources from cloud service providers such as Amazon Web Services® (AWS), Microsoft Azure® services, and Google Cloud Platform®. The storage devices used in a datacenter will have a large amount of data that are frequently replaced based on the tenancy applications and their operating configurations can change as tenancy changes. In addition, those cloud storage devices are not typically optimized for leasing and subscription models. Hence, it is desirable to optimize fresh or pre-assigned storage devices in a datacenter prior to assigning applications and writing data to them.

SUMMARY

According to one embodiment, a data storage system includes: a plurality of data storage devices; a motherboard containing a baseboard management controller (BMC); and a network switch configured to route network traffic to the plurality of data storage devices. The BMC is configured to identify a group of data storage devices among the plurality of data storage devices based on device-specific information received from the plurality of data storage devices and send identifiers of the group of data storage devices to a querying party.

According to another embodiment, a method includes: receiving device-specific information from a plurality of data storage devices included in a data storage system using a baseboard management controller (BMC); identifying a group of data storage devices among the plurality of data storage devices based on attributes of the plurality of data storage devices; and sending identifiers of the group of data storage devices to a querying party.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale, and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for fine tuning and optimizing solid-state drives (SSDs) that are compatible with the NVMe-oF standard. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a data storage system and a method for fine tuning and optimizing data storage devices present in the data storage system. The data storage devices may be of various types and sizes made and distributed by different manufacturers and vendors. According to one embodiment, the data storage device is a solid-state drive (SSD) that is compatible with the NVMe-oF specification, herein also referred to as an NVMe-oF device or an NVMe-oF SSD. The NVMe-oF device is compatible with various underlying storage networking fabrics such as Ethernet, Fibre Channel, InfiniBand, and a transmission control protocol (TCP) network. According to one embodiment, the present data storage system is a rack-mounted system. Each rack in a datacenter can contain a combination of sleds and/or trays for accommodating compute and data storage devices.

The present data storage system includes a chassis and a motherboard containing a baseboard management controller (BMC) disposed in the chassis. According to one embodiment, the BMC can optimize NVMe-oF SSDs present in the chassis of the data storage system. After the data storage system is initialized, the BMC is aware of all NVMe-oF SSDs present in the chassis. The NVMe-oF SSDs that are identified by the BMC as having desired attributes can be optimized and assigned to a specific application.

The present data storage system allows a user or an application to take advantage of the BMC's knowledge on the SSDs that are present in the chassis when making determination to use the SSDs that satisfy user/application-specific requirements. The BMC can identify SSDs that can meet the data profiles and attributes of a service level agreement (SLA) as specified by the use or the application before committing and assigning the SSDS according to the SLA. The BMC can prepare the selected SSDs, for example securely erasing the stored data, after the current-running service expires or before the new service launches.

The use of the BMC for identifying SSDs present in the chassis that meet the required criteria and preparing them can lessen the burden of a local CPU of the chassis allowing the local CPU to execute critical and/or frequent tasks such as data input and output (I/O) without sacrificing the performance. The BMC can handle less critical and/or infrequent tasks such as the identification of the SSDs present in the chassis, updating the data profiles of the SSDs, preparing the SSDs for a new service or application. The total cost of ownership (TCO) of the data storage system including capital expenditure (CapEx) and/or operating expenditure (Opex) can be lowered by properly delegating less-critical and infrequent tasks to the BMC that are otherwise executed by the local CPU. For example, the local CPU in the chassis may be replaced with a less expensive CPU that has a specification enough to perform the critical and/or frequent tasks equivalent to the original CPU. This can result in no or minimal impact to the I/O performance of the data storage system while reducing the cost.

Figure 1:
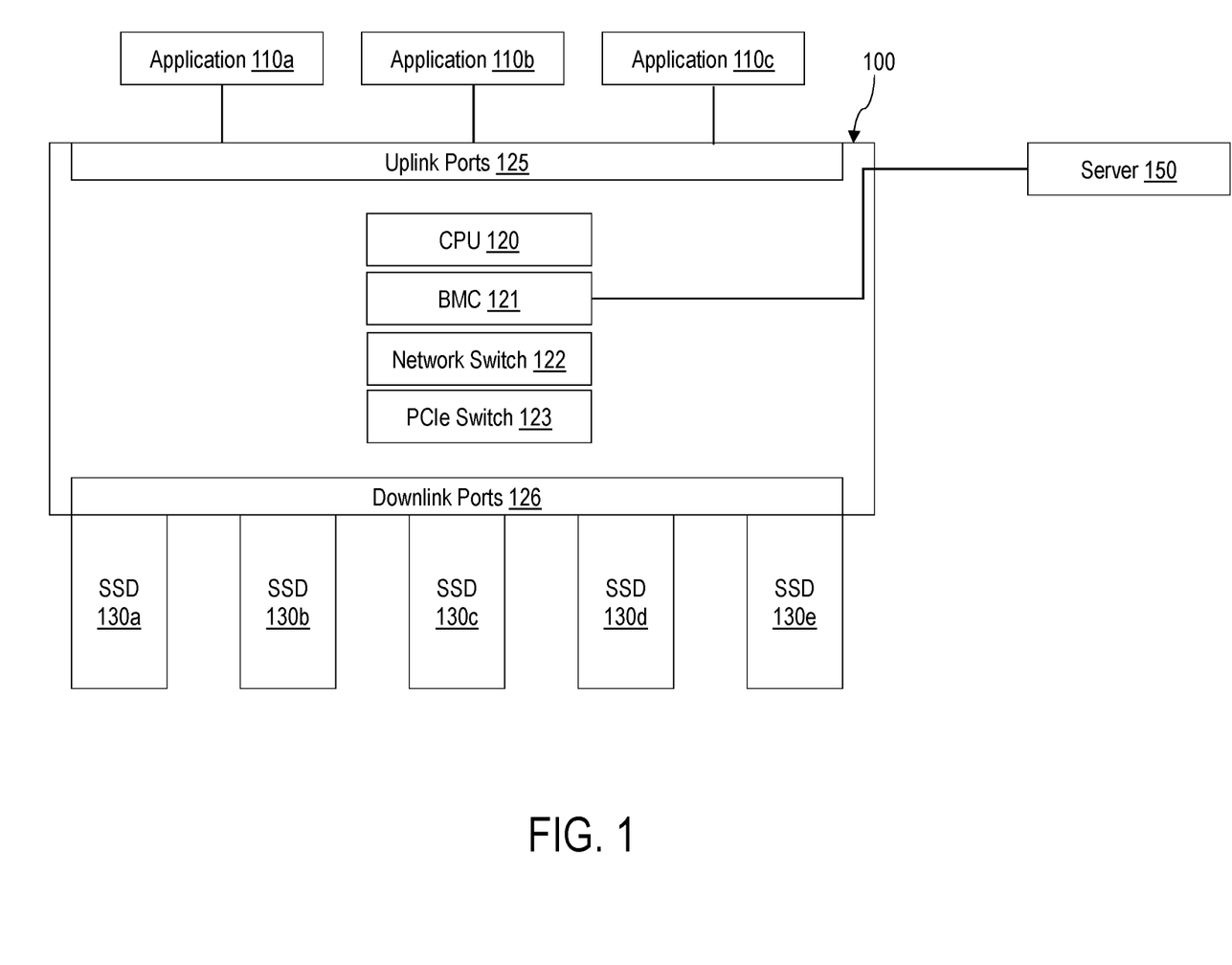
FIG. 1 shows an example data storage system, according to one embodiment.

FIG. 1 shows an example data storage system, according to one embodiment. The data storage system 100 can be one of many of data storage systems in a data center of a cloud service provider. Examples of the cloud service provider include Amazon Web Services (AWS), Microsoft Azure services, and Google Cloud Platform. The data center also has one or more computing nodes running applications 110a, 110b, and 110c and a server 150 that provides an interface for the cloud service.

The data storage system 100 has a chassis that can hold a plurality of SSDs 130a-130e via a plurality of device ports of the chassis. For example, each SSD 130 can be inserted into a device port of the chassis using a U.2 connector or other standard connectors. Although the present example shows three applications and five SSDs, but it is understood that any number of applications may run, and any number of SSDs may be present in the chassis. For example, up to 24 or 48 SSDs may be inserted to the device ports of the data storage system 100 depending on the configuration. The application 110a may use data stored in the SSDs 130a and 130c, the application 110b may use data stored in the SSDs 130b and 130d, and the application 110c may use data stored in the SSD 130e. A user (e.g., an enterprise user) can run an application run over the cloud using the SSDs owned and managed by the cloud service provider.

The chassis includes a CPU 120, a BMC 121, a network switch 122 configured to transport network signals, a peripheral component interconnect express (PCIe) switch 123 configured to transport PCIe signals over a PCIe bus, a plurality of uplink ports 125, and a plurality of downlink ports 126. According to one embodiment, the underlying fabrics of the data storage system 110 is Ethernet. In this case, the network switch 122 is an Ethernet switch, and the uplink ports 125 and the downlink ports 126 are Ethernet ports. Each of the downlink ports 126 is connected to a respective SSD 130.

The CPU 120 is configured to run an operating system (e.g., Linux) with software-defined networking protocols such as Ethernet for providing I/O operations between applications 110 and SSDs 130. The BMC 121 manages the motherboard of the chassis and the SSDs present in the chassis via a management port (e.g., Intelligent Platform Management Interface (IPMI), NVMe Management Interface (NVMe-MI), Management Component Transport Protocol (MTCP). For example, the BMC 121 can detect insertion, removal, and drive faults of SSDs 130, monitor sensors throughout the chassis, and control a fan speed of the chassis. Both the CPU 120 and the BMC 121 are capable of initiating PCIe transactions to the SSDs 130 and other components of the chassis. Typically, the BMC 121 uses a low-cost CPU (e.g., an ARM processor) while the CPU 120 uses a high-performance, high-cost CPU (e.g., an X86 CPU with multicores).

According to one embodiment, the SSDs 130 can push some device-specific information to the BMC 121 over a control plane via a PCI bus that is established between the motherboard of the chassis and the SSDs 130. Examples of such device-specific information that can be carried over the control plane include, but are not limited to, discovery information and field-replaceable unit (FRU) information of the SSDs 130. In particular, the device-specific information can be consumed by the BMC 121 to identify SSDs 130 that have specific requirements and attributes. This can reduce the burden of the BMC 121 for polling the status of the SSDs 130.

A user or a service manager of the cloud service provider, or an application 110 running on a computing node of the datacenter can send a query to the server 150 to lease computing and/or storage resources from the cloud service provider. In response to the query, the server 150 communicate with BMC 121 (and other BMCs) in the datacenter to send the device-specific information of the SSDs that they manage. According to one embodiment, the SSD information retrieved by the BMC 121 include attributes of the SSDs 130. Examples of the attributes include, but are not limited to, a vendor ID (VID), a subsystem vendor ID (SSVID), a serial number (SN), a model number (MN), a capacity, a maximum data transfer size (MDTS), a number of data units read, a number of data units written, host read commands, host write commands, and a controller busy time. In addition to the SSD attributes, the BMC 121 can send to the server 150 additional information of the SSDs 130 such as the current usage and/or availability during a specific time period in which the user (or an application) intends to run an application. In one embodiment, the query of a user may be automatically generated based on an SLA established between the user and the cloud service provider or an application 110 that needs additional SSDs 130.

According to one embodiment, the server 150 may be a web server that is configured to provide a user interface to a user or a service manager. The communication between the server 150 and the BMC 121 may be via a management port. The BMC 121 manages the SSDs 130 present in the chassis, therefore is aware of the status and attributes of all the SSDs 130 present in the chassis. According to one embodiment, the BMC 121 can send the status and attribute information of the SSDs 130 present in the chassis that meet the attributes and are available during the time window as specified by the user. Based on the status and attributes information received from the BMC 121 and other BMCs in the datacenter, the server 150 can identify a total number of SSDs that can meet the required status and attributes and are available during the time window. Using the status and attribute information provided by the server 150, the user can decide to enter into a service agreement with the cloud service provider and commit to use the SSDs for the specified time window. Based on the service agreement, the BMC 121 can send a report to the user that the specified SSDs are available and ready, and the user can run an application 110 using the storage spaces of the qualified SSDs 130 during the specified time window. Upon completion of the lease, the server 150 can notify the user that the service has expired and clean up the SSDs 130 for the next service by sending a command to the BMC 121. Depending on an application specified in the SLA, the BMC 121 can optimize and/or initialize the SSDs 130 to prepare the SSDs 130 suited for the application.

According to one embodiment, a manager of the cloud service provider or a qualified application running on a computing node in the datacenter can allocate and use the SSDs 130 based on their attributes and availability. The manager of the cloud service provider may exchange the status and attribute information of the SSDs with managers of different datacenters to efficiently allocate, assign, and use their SSDs among the different datacenters.

According to one embodiment, the BMC 121 may voluntarily send attribute information of one or more SSDs to the server 150 when the SSDs becomes available. The server 150 can use the attribute information unless the status of the SSDs changes and advertise to a requesting party that the SSDs having certain attributes are available to potential users of the cloud service.

FIGS. 2A, 2B, 2C, and 2D show an example flowchart for specifying and optimizing SSDs present in a chassis using a BMC, according to one embodiment. According to one embodiment, the BMC can run an optimizer to optimize the performance of the SSDs. The optimizer is a process that is run by the BMC and may be implemented as a software or a firmware. Initially, the BMC may not be loaded with the optimizer. In this case, the optimizer may be downloaded externally at request of a user, an application, or a manager of the cloud service provider. The BMC loaded with the optimizer can provide attribute information of the SSDs to a requesting party to optimize the use and conditions of the SSDs.

Figure 2A:
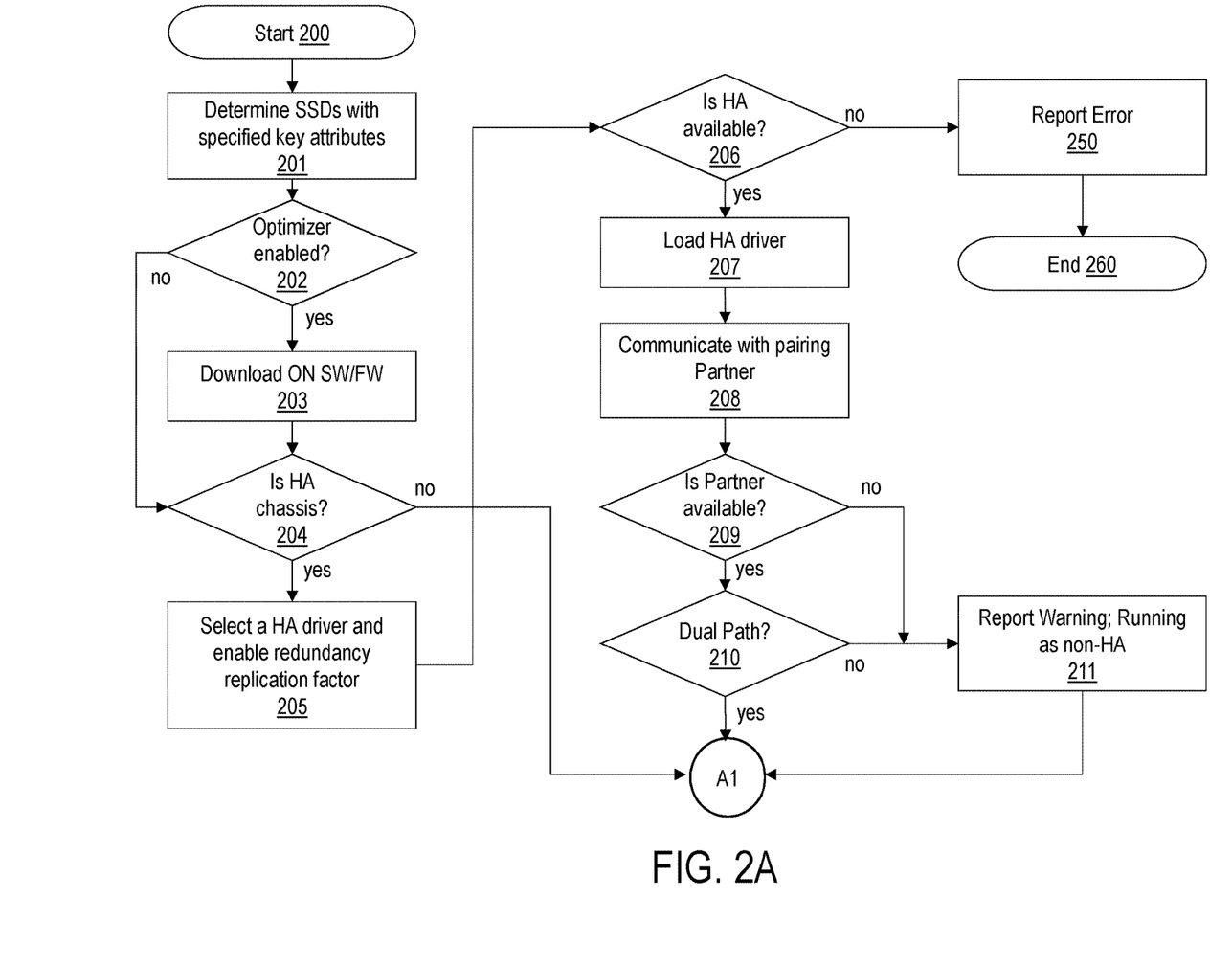
FIGS. 2A, 2B, 2C, and 2D show an example flowchart for specifying and optimizing SSDs present in a chassis using a BMC, according to one embodiment.

Referring to FIG. 2A, a manager (e.g., a resource fulfillment application) of the cloud service provider receives a lease order from a user including specified key attributes of SSDs and requests a response from BMCs in a pool. Based on the responses from the BMCs, the manager determines the SSDs present in a chassis meeting the specified key attributes (201). The BMC may already know the type of the SSDs present in the chassis when the SSDs are inserted into the device ports of the chassis using a sensor. Initially, the BMC may not be equipped with or configured to run an optimizer. If the optimizer of the BMC is not enabled or loaded (202), the manager of the cloud service provider can download the optimizer software or firmware (203). The manager then determines whether the chassis is configured to run in a high-availability (HA) mode (204). If the chassis is configured as a HA chassis, the manager selects a proper HA driver and enable a redundancy replication factor of the HA chassis (205). The manager further checks if the HA mode is available for a particular chassis (206). If the selected chassis is a HA chassis but the HA mode is not available, the manager reports an error (250) and determines that the optimizer of the BMC is not enabled (260). If the HA mode is available, the manager loads the HA driver selected in step 205 (207) and communicates with a pairing partner (208). In the HA mode, the pairing partner can be another computing node in the same chassis or in a different chassis. When a partner fails, the pairing partner can take over the tasks of the partner. This can minimize or eliminate the system downtime. If the pairing partner is available (209) and a dual path is available for the selected chassis (210), the manager determines the type of the SSDs present in the chassis. For example, the manager can instruct the BMC to provide the type of the SSDs. Otherwise, the manager reports a warning and configures to run the chassis in a non-HA mode (211).

Figure 2B:
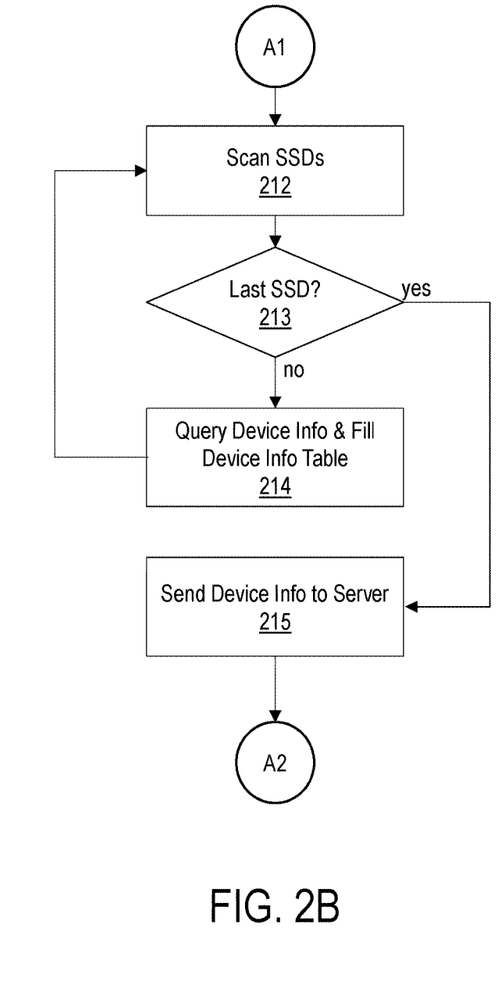

Referring to FIG. 2B, the BMC scans SSDs present in the chassis (201). If there is a new SSD to scan, the BMC sends a query for the device-specific information to the new SSD and fills the device-specific information of the new SSD in a device information table (214). If there is no more SSD to scan, the BMC sends the collected device-specific information to the server (215). This scanning and querying process repeats until the device-specific information table contains the device information for all the scanned SSDs present in the chassis.

Figure 2C:
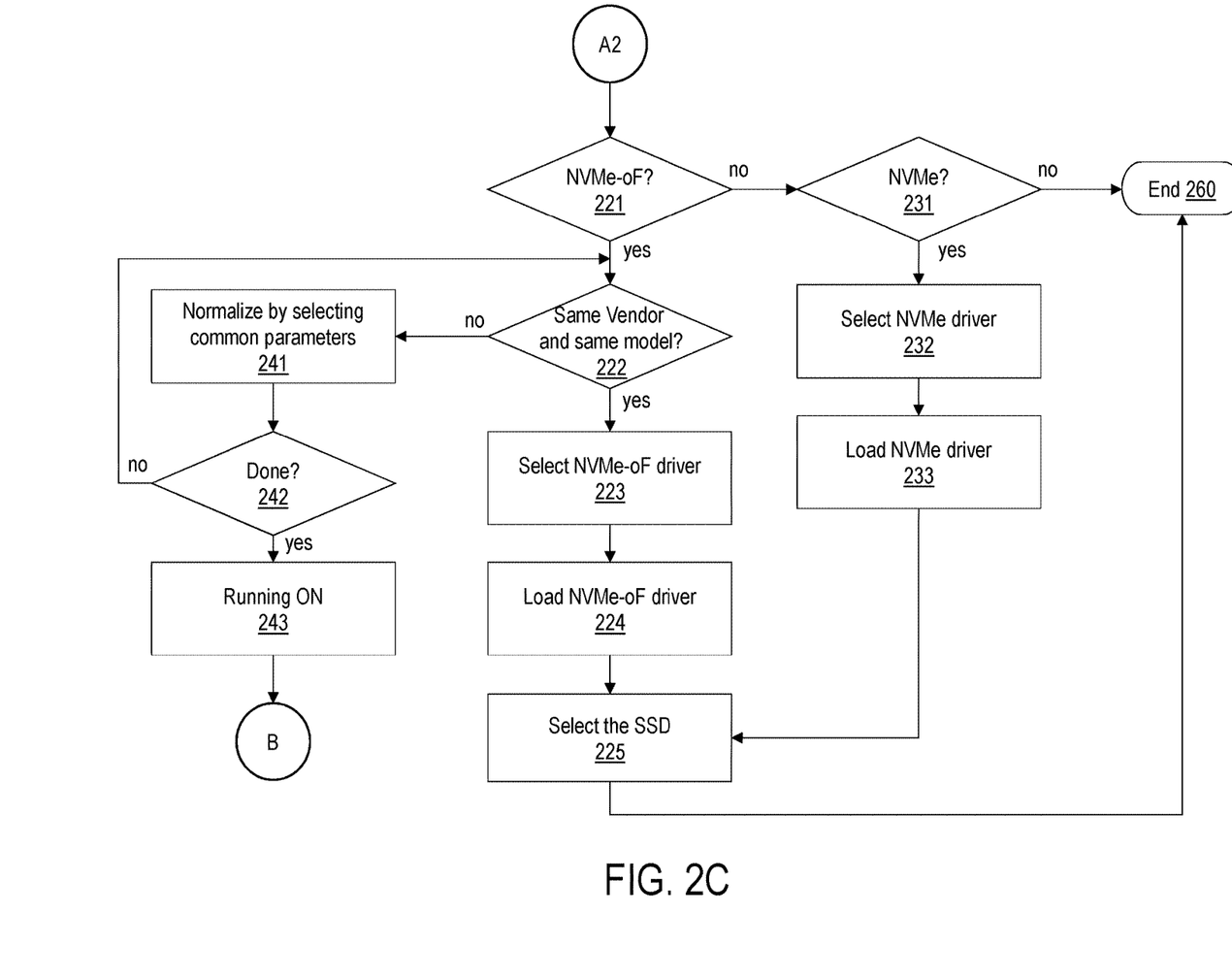

Referring to FIG. 2C, the BMC configures the SSDs present in the chassis using the optimizer depending on the type and their attributes. Once the optimizer is loaded, the BMC is ready to perform the optimization processes as needed. For example, the BMC detects an insertion, a removal, or a fault of an SSD, and performs the optimization accordingly. In one embodiment, the BMC checks if a selected SSD is an NVMe-oF SSD (221) or an NVMe SSD (231). If the selected SSD is an NVMe-oF SSD, the BMC further checks if the selected SSD is from the same vendor and the same model (222). In this case, the vendor may be specified in a request from a user, an application, or the manager of the cloud service provider. If the selected SSD is not from the same vendor, the BMC normalizes the SSD by selecting common parameters (241). In the case of different vendors, the BMC may normalize the SSD by choosing different SSD(s) from one vender base on common parameters and/or attributes with the SSD(s) from another vendor. After the common parameters of all the SSDs present in the chassis, the BMC starts to run the optimizer (243). If the selected SSD is from the same vendor, the BMC selects the NVMe-oF driver (223), loads the selected NVMe-oF driver (224), and selects the SSD (225). If the selected SSD is an NVMe SSD, the BMC selects the NVMe driver (232) and loads the selected NVMe driver (233).

Figure 2D:
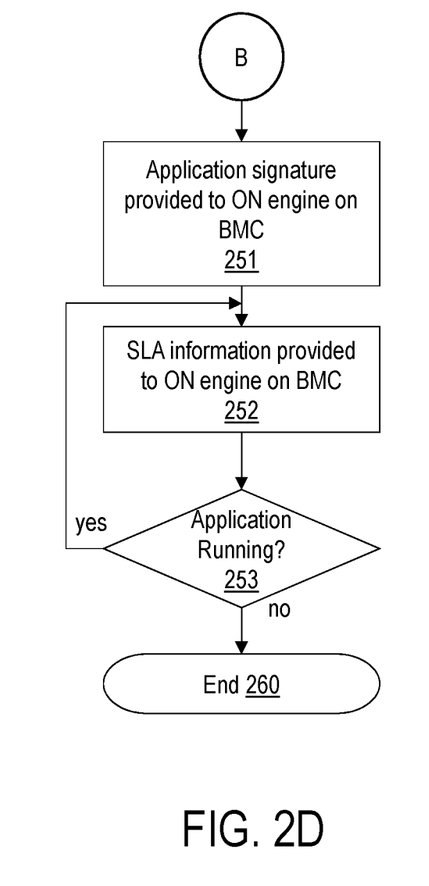

Referring to FIG. 2D, the optimizer of the BMC receives a signature of an application to be run on the selected SSD (251) as well as the SLA information (252). While the application runs (253), the BMC continues to receive the SLA information until the application stops (260).

Figure 3:
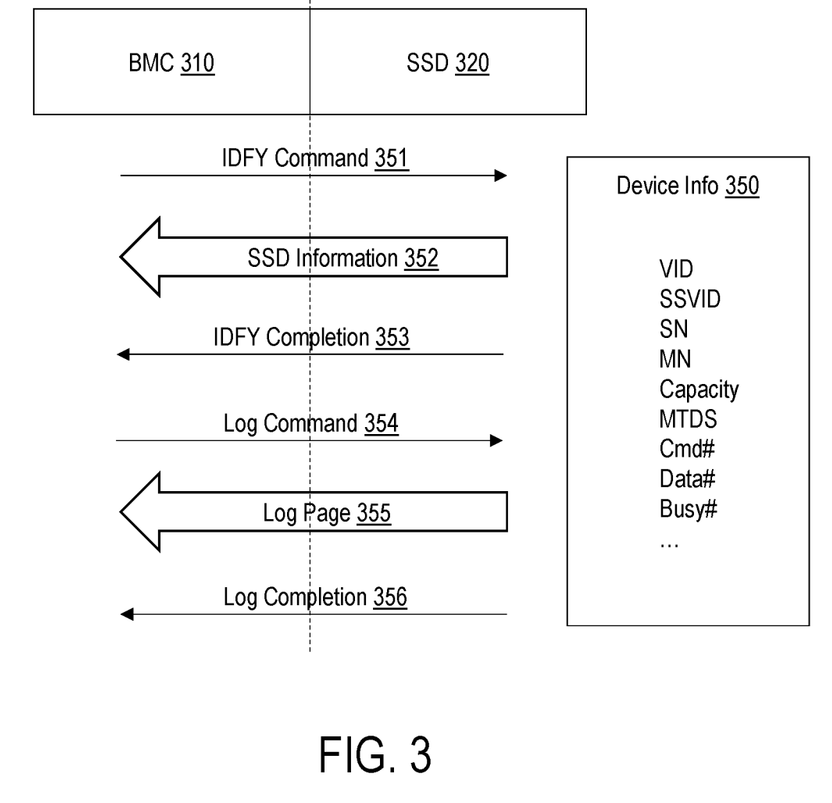
FIG. 3 shows example transactions between a BMC and an SSD, according to one embodiment.

FIG. 3 shows example transactions between a BMC and an SSD, according to one embodiment. According to one embodiment, the BMC 310 can run an optimizer (ON). In the case where the SSD 320 is an NVMe-oF SSD, the optimizer running on the BMC 310 is supported by the NVMe-oF specification.

The optimizer sends an IDFY command 351 to the SSD 320. In response to the IDFY command 351, the SSD 320 prepares and sends the SSD information 352 to the BMC 310. After successfully sending the SSD information 352, the SSD 320 sends an IDFY completion entry to the BMC 310. The BMC 310 further send a log command to the SSD 320 requesting log information of the SSD 320. The SSD 320 sends a log page 355 to the BMC 310. The log page 355 can include SMART/health information log and a vendor-specific log page about performance and resource. After successfully sending the log page, the SSD 320 sends a log completion entry 356.

The optimizer of the BMC can support NVMe-oF SSDs and identify NVMe-oF SSDs that have certain attributes. Based on their attributes, the optimizer can optimize and normalize different type/size of NVMe-oF SSDs present in the chassis.

Each NVMe-oF SSD in the chassis can report its own device-specific information 350 to the optimizer running on the BMC. The reporting of the device-specific information may be periodic or at a request by the BMC. Examples of the device-specific information 350 include, but are not limited to, a vendor ID (VID), a subsystem vendor ID (SSVID), a serial number (SN), a model number (MN), a capacity, a maximum data transfer size (MDTS), a number of data units read, a number of data units written, host read commands, host write commands, and a controller busy time. For example, the NVMe-oF SSD can provide the device-specific information 350 to the optimizer via an NVMe Identify (IDFY) command and/or a CMB Query service for a quick query.

According to one embodiment, the BMC can send a query to an SSD present in the chassis requesting its device-specific information 350 at a request of a requesting party. Based on the device-specific information 350 collected for the SSDs present in the chassis, the BMC can categorize the SSDs into one or more groups based on their attributes. The BMC can provide these attributes to the requesting party before the SSDs are allocated and an application intended to use the SSDs is launched. The optimizer can collect and analyze the device-specific information 350 to provide useful information to the requesting party. For example, the requesting party can make an informed decision as to whether or not the SSDs intended to be used for the application have the required attributes, configurations, and data profiles.

According to one embodiment, the SSD has a memory buffer that is logically owned, managed, and accessible by the BMC. The BMC may directly access the memory buffer of the SSD without involving any protocol process.

According to one embodiment, the present disclosure provides a system and method for providing optimization of a variety of SSDs from multiple vendors. A cloud service provider can provide a pool of SSDs for running an application based on a customer-defined SLA. Using the SSD information collected by the BMC, the cloud service provider can facilitate a resource-leasing service to a potential user. The user can specify desired attributes of SSDs and review the attributes and status of the available SSDs prior to committing to a lease. The BMC can clean up the SSDs after the current application completes or the current lease expires. For example, the BMC can securely erase or tear down the leased configurations and data for the subscription for a new user.

According to one embodiment, the SSDs are reconfigurable based on a need of an application. Some attributes of the SSDs may be changed over a period of time after being repeatedly leased and configured for different applications. The BMC can run the optimizer to update the attributes of the SSDs. The host can not only select SSDs that can meet a customer application profile but also reconfigure SSDs that may not be currently optimized for a specific application.

The BMC can reconfigure the SSDs into an optimal condition ready to run the application before the SSDs are assigned to the application.

According to one embodiment, a data storage system includes: a plurality of data storage devices; a motherboard containing a baseboard management controller (BMC); and a network switch configured to route network traffic to the plurality of data storage devices. The BMC is configured to identify a group of data storage devices among the plurality of data storage devices based on device-specific information received from the plurality of data storage devices and send identifiers of the group of data storage devices to a querying party.

The data storage device may be a solid-state drive (SSD) that is compatible with the NVMe-oF standard, and the network switch may be an Ethernet switch, and the plurality of uplink ports and the plurality of downlink ports may be Ethernet ports.

Each of the plurality of data storage devices may send the device-specific information to the BMC over a PCI bus.

The device-specific information may include discovery information and field-replaceable unit (FRU) information of the plurality of data storage devices.

The device-specific information may further include attributes of the plurality of data storage devices including one or more of a vendor ID (VID), a subsystem vendor ID (SSVID), a serial number (SN), a model number (MN), a capacity, a maximum data transfer size (MDTS), a number of data units read, a number of data units written, host read commands, host write commands, and a controller busy time.

The device-specific information may further include a current usage or availability of the plurality of data storage devices during a specific time period.

The BMC may send a query to the plurality of data storage devices in response to the querying party, and the plurality of data storage devices may send the device-specific information to the BMC in response to the query by the BMC.

The query may be automatically generated based on service level agreement (SLA).

The query may include requirements of attributes for the data storage devices.

The BMC may send the group of data storage devices among the plurality of data storage devices that satisfies the requirements of attributes to the querying party.

The BMC may be further configured to clean up the group of data storage devices.

According to another embodiment, a method includes: receiving device-specific information from a plurality of data storage devices included in a data storage system using a baseboard management controller (BMC); identifying a group of data storage devices among the plurality of data storage devices based on attributes of the plurality of data storage devices; and sending identifiers of the group of data storage devices to a querying party.

The data storage device may be a solid-state drive (SSD) that is compatible with the NVMe-oF standard, and the network switch may be an Ethernet switch, and the plurality of uplink ports and the plurality of downlink ports may be Ethernet ports.

Each of the plurality of data storage devices may send the device-specific information to the BMC over a PCI bus.

The device-specific information may include discovery information and field-replaceable unit (FRU) information of the plurality of data storage devices.

The device-specific information may further include attributes of the plurality of data storage devices including one or more of a vendor ID (VID), a subsystem vendor ID (SSVID), a serial number (SN), a model number (MN), a capacity, a maximum data transfer size (MDTS), a number of data units read, a number of data units written, host read commands, host write commands, and a controller busy time.

The device-specific information may further include a current usage or availability of the plurality of data storage devices during a specific time period.

The BMC may send a query to the plurality of data storage devices in response to the querying party, and the plurality of data storage devices may send the device-specific information to the BMC in response to the query by the BMC.

The method may further include automatically generating the query based on service level agreement (SLA).

The query may include requirements of attributes for the data storage devices.

The BMC may send the group of data storage devices among the plurality of data storage devices that satisfies the requirements of attributes to the querying party.

The method may further include: cleaning up the group of data storage devices using the BMC.

The above example embodiments have been described hereinabove to illustrate various embodiments of implementing a system and method for fine tuning and optimizing NVMe-oF solid-state drives (SSDs). Various modifications and departures from the disclosed example embodiments will occur to those having ordinary skill in the art. The subject matter that is intended to be within the scope of the invention is set forth in the following claims.

What is claimed is:

1. A method comprising:
    sending a query to a data storage device from a controller of a data storage system using a control connection, wherein the data storage device is removable, wherein a dual path is available in a high availability (HA) mode in the data storage system;
    receiving, at the controller, based on the query, first information associated with the data storage device; and
    sending second information associated with the data storage device from the controller to a second device using a management port,
    wherein the data storage system is compatible with a fabric protocol.

2. The method of claim 1, wherein the method further comprises selecting a HA driver.

3. The method of claim 2, wherein the HA driver enables a redundancy factor.

4. The method of claim 1, wherein, a based on a status of a first path of the dual path, a second path of the dual path is available to access data stored in the data storage device in the high availability mode.

5. The method of claim 1, wherein the data storage system further comprises:
    a first pairing partner configured to perform one or more first tasks; and
    a second pairing partner configured to perform one or more second tasks,
    wherein the method further comprises, based on a status of the first pairing partner, performing the one or more second tasks by the second pairing partner.

6. The method of claim 5, wherein the second pairing partner performs the one or more first tasks.

7. The method of claim 6, wherein the second pairing partner performs the one or more first tasks using a first path, and wherein the second pairing partner performs the one or more second tasks using a second path.

8. The method of claim 1, wherein the controller comprises a component of the data storage system, and wherein the second device comprises a server operable to communicate with the component using the management port using a protocol compatible with the server.

9. The method of claim 1, wherein the controller comprises a baseboard management controller.

10. The method of claim 1, wherein the first information includes an attribute of the data storage device.

11. A data storage system comprising:
- a data storage device compatible with a fabric protocol and operable in a high availability (HA) mode using a dual path; and
- a controller configured to send a query to the data storage device using a control connection,
- wherein the controller receives first information associated with the data storage device based on the query, and
- wherein the controller sends second information associated with the data storage device to a second device using a management port.

12. The data storage system of claim 11, wherein the controller selects a HA driver to operate the data storage device in the HA mode.

13. The data storage system of claim 12, wherein the HA driver enables a redundancy factor.

14. The data storage system of claim 11, wherein, based on a status of a first path of the dual path, a second path of the dual path is available to access data stored in the data storage device in the high availability mode.

15. The data storage system of claim 11, further comprising:
- a first pairing partner configured to perform one or more first tasks; and
- a second pairing partner configured to perform one or more second tasks,
- wherein, based on a status of the first pairing partner, the second pairing partner performs the one or more first tasks.

16. The data storage system of claim 15, wherein the second pairing partner performs the one or more first tasks.

17. The data storage system of claim 16, wherein the second pairing partner performs the one or more first tasks using a first path of the dual path, and wherein the second pairing partner performs the one or more second tasks using a second path of the dual path.

18. The data storage system of claim 11, wherein the controller comprises a component of the data storage system, and wherein the second device comprises a server operable to communicate with the component using the management port using a protocol compatible with the server.

19. The data storage system of claim 11, wherein the controller comprises a baseboard management controller.

20. The data storage system of claim 11, wherein the first information includes an attribute of the data storage device.

* * * * *